US010223672B2

United States Patent
Jang et al.

(10) Patent No.: US 10,223,672 B2
(45) Date of Patent: Mar. 5, 2019

(54) METHOD, SYSTEM, AND PROGRAM PRODUCT FOR DIFFERENTIALLY DISPLAYING AN INSTANT MESSAGING (IM) AVAILABILITY

(75) Inventors: Soobaek Jang, Hamden, CT (US); Moon J. Kim, Wappingers Falls, NY (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 11/612,511

(22) Filed: Dec. 19, 2006

(65) Prior Publication Data

US 2008/0148158 A1    Jun. 19, 2008

(51) Int. Cl.
    *G06Q 10/10*     (2012.01)
    *H04L 12/58*     (2006.01)
    *G06F 12/14*     (2006.01)

(52) U.S. Cl.
    CPC .......... *G06Q 10/107* (2013.01); *H04L 51/04* (2013.01); *G06F 12/1491* (2013.01)

(58) Field of Classification Search
    CPC ..... H04L 51/04; H04L 12/581; H04L 65/403; H04L 12/1813; H04L 51/043
    USPC ........................................................ 715/752
    See application file for complete search history.

(56) References Cited

U.S. PATENT DOCUMENTS

| 6,301,609 | B1 | 10/2001 | Aravamudan et al. |
| 6,938,213 | B2* | 8/2005 | Brown ................. G06Q 10/109 715/752 |
| 7,480,696 | B2 | 1/2009 | Kirkland et al. |
| 2004/0243941 | A1* | 12/2004 | Fish ...................... G06Q 10/107 715/752 |
| 2005/0055405 | A1 | 3/2005 | Kaminsky et al. |
| 2005/0149622 | A1 | 7/2005 | Kirkland et al. |
| 2005/0222890 | A1* | 10/2005 | Cheng ................. G06Q 10/109 705/7.19 |
| 2005/0223075 | A1* | 10/2005 | Swearingen ............ H04L 51/04 709/207 |

* cited by examiner

*Primary Examiner* — Sherrod L Keaton
(74) *Attorney, Agent, or Firm* — Brian Restauro; Hoffman Warnick LLC

(57) ABSTRACT

The invention provides a method, system, and program product for differentially displaying an instant messaging (IM) availability to a plurality of potential interlocutors. In one embodiment, the invention includes creating a relationship chart of potential interlocutors based on an organizational chart; defining a willingness to communicate, including a temporal component; establishing an IM availability for each potential interlocutor using the relationship chart and the willingness to communicate; sending the IM availability to a server; transmitting the IM availability from the server to a potential interlocutor's computing device capable of displaying the IM availability; receiving an IM invitation from an interlocutor; and generating an alert based on the IM availability for the interlocutor.

20 Claims, 3 Drawing Sheets

METHOD, SYSTEM, AND PROGRAM PRODUCT FOR DIFFERENTIALLY DISPLAYING AN INSTANT MESSAGING (IM) AVAILABILITY

BACKGROUND OF THE INVENTION

1. Technical Field

The invention relates generally to messaging systems, and more particularly, to a method, system, and program product for differentially displaying an instant messaging (IM) availability to a plurality of potential interlocutors.

2. Background Art

Instant messaging (IM) is often used for both personal and business-related communications. In a work environment, IM can greatly enhance work performance by instantly connecting two or more employees, who can then collaborate to solve a particular problem or execute a task.

Receiving too many IM invitations or receiving IM invitations at inconvenient times can, however, decrease an employee's performance by distracting him/her from other duties. Most IM systems permit a user to establish his/her online status or availability, which is then displayed to potential interlocutors. For example, a user may set his/her status to "do not disturb," in which case potential interlocutors known not to send the user an IM invitation. Optionally, some systems automatically block IM invitations from potential interlocutors when a user's status indicates unavailability (e.g. "do not disturb").

Such solutions are often overly restrictive, however, in that all potential interlocutors are treated in the same manner. It may be desirable, for example, for a user's supervisor to be able to send the user an IM invitation even though his/her status is "do not disturb."

To this extent, a need exists for an IM method and system that does not suffer from defects known in the art.

SUMMARY OF THE INVENTION

The invention provides a method, system, and program product for differentially displaying an instant messaging (IM) availability to a plurality of potential interlocutors. In one embodiment, the invention includes creating a relationship chart of potential interlocutors based on an organizational chart; defining a willingness to communicate, including a temporal component; establishing an IM availability for each potential interlocutor using the relationship chart and the willingness to communicate; sending the IM availability to a server; transmitting the IM availability from the server to a potential interlocutor's computing device capable of displaying the IM availability; receiving an IM invitation from an interlocutor; and generating an alert based on the IM availability for the interlocutor.

A first aspect of the invention provides a method for differentially displaying an instant messaging (IM) availability to a plurality of potential interlocutors, the method comprising: creating a relationship chart of potential interlocutors; defining a willingness to communicate; establishing an IM availability for each potential interlocutor using the relationship chart and the willingness to communicate; sending the IM availability to a server; and transmitting the IM availability from the server to a potential interlocutor's computing device capable of displaying the IM availability.

A second aspect of the invention provides a system for differentially displaying an instant messaging (IM) availability to a plurality of potential interlocutors, the system comprising: a system for creating a relationship chart of potential interlocutors; a system for defining a willingness to communicate; a system for establishing an IM availability for each potential interlocutor using the relationship chart and the willingness to communicate; a system for sending the IM availability to a server; and a system for transmitting the IM availability from the server to a potential interlocutor's computing device capable of displaying the IM availability.

A third aspect of the invention provides a program product stored on a computer-readable medium, which when executed, differentially displays an instant messaging (IM) availability to a plurality of potential interlocutors, the program product comprising: program code for creating a relationship chart of potential interlocutors; program code for defining a willingness to communicate; program code for establishing an IM availability for each potential interlocutor using the relationship chart and the willingness to communicate; program code for sending the IM availability to a server; and program code for transmitting the IM availability from the server to a potential interlocutor's computing device capable of displaying the IM availability.

A fourth aspect of the invention provides a method for deploying an application for differentially displaying an instant messaging (IM) availability to a plurality of potential interlocutors, comprising: providing a computer infrastructure being operable to: create a relationship chart of potential interlocutors; define a willingness to communicate; establish an IM availability for each potential interlocutor using the relationship chart and the willingness to communicate; send the IM availability to a server; and transmit the IM availability from the server to a potential interlocutor's computing device capable of displaying the IM availability.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for differentially displaying an instant messaging (IM) availability to a plurality of potential interlocutors.

Figure 1:
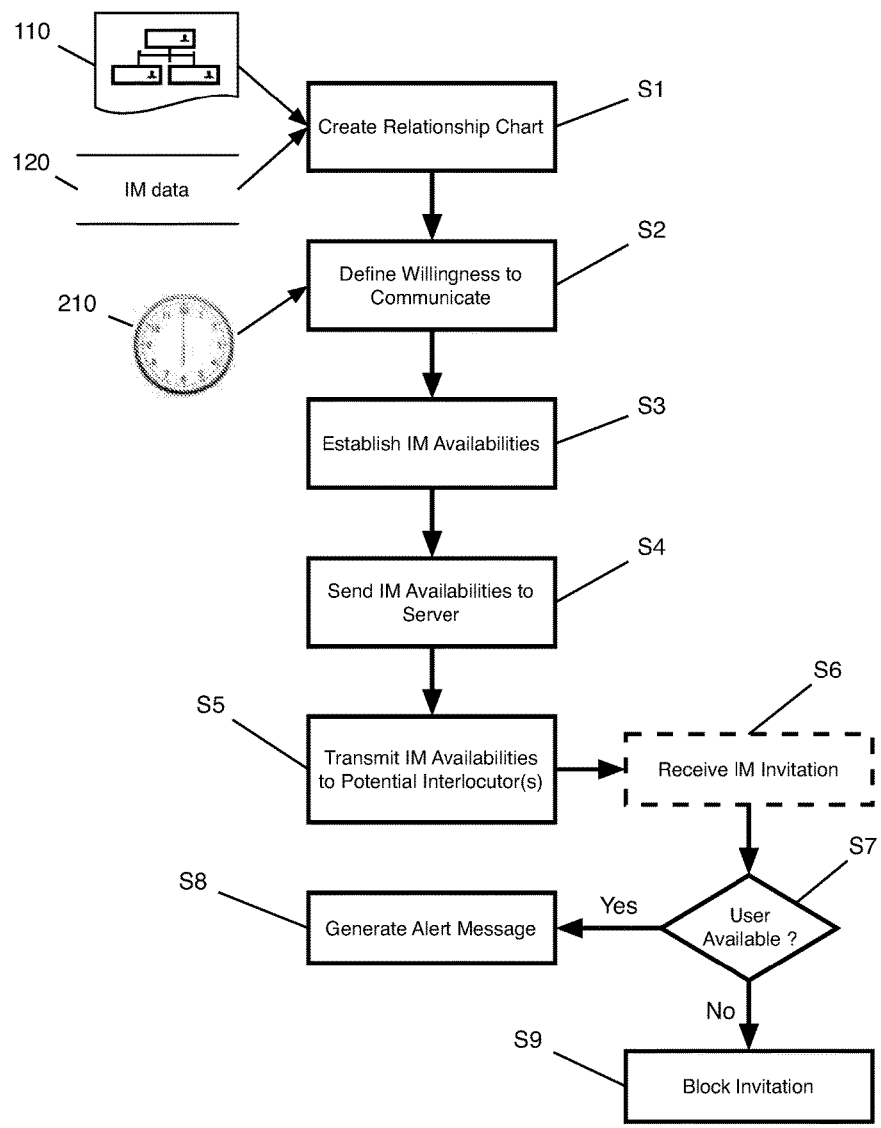
FIG. 1 shows a flowchart of an illustrative method according to the invention.

Referring now to the drawings, FIG. 1 shows a flow diagram of an illustrative method according to the invention. At S1, a relationship chart is created including data related to the relationships between a user and his/her potential interlocutors. In some embodiments, the relationship chart may include or utilize an organizational chart 110 of the user's business or another group to which the user belongs. In other embodiments, the relationship chart may include or utilize IM data 120 related to past IM activity of the user (e.g., with whom the user has corresponded using IM).

At S2, the user defines a willingness to communicate. The willingness to communicate may take any number of forms. For example, a user may select a willingness from a group of text-based descriptions of willingness (e.g., "available," "busy," "very busy," "do not disturb," "offline," etc.). Alternatively, the willingness to communicate may utilize a scale (e.g., from "1" to "10" with "1" indicating availability and "10" indicating unavailability). Other methods and techniques for indicating a user's willingness to communicate are possible, of course, and within the scope of the invention.

As shown in FIG. 1, the willingness to communicate defined at S2 may include a temporal component 210. For example, a user may indicate that he/she is unavailable for a particular period of time (e.g., "do not disturb until 3 PM," "available between 9 AM and 12 PM," etc.).

At S3, an IM availability is established for each potential interlocutor using the relationship chart created at S1 and the willingness to communicate defined at S2. For example, a user may define his/her willingness to communicate as "very busy" at S2. Based on this, the IM availability of the user to one subset of potential interlocutors (e.g., those lower in the organizational chart 110 used to create the relationship chart) will be established as "unavailable" or some equivalent, while the IM availability of the user to another subset of potential interlocutors (e.g., those higher in the organizational chart 110) will be established as "available," "very busy," or some availability other than "unavailable." Thus, a user need only define a single willingness to communicate in order to differentially display his/her IM availability to a plurality of potential interlocutors.

Alternatively, as will be described in greater detail below, the same IM availability may be established for all potential interlocutors using the willingness to communicate defined at S2, with IM invitations from one subset of potential interlocutors being blocked and IM invitations from another subset of potential interlocutors being displayed to the user.

At S4, the IM availability (or IM availabilities) established at S3 is sent to an IM server or other storage device for storing, accessing, and/or routing IM data between individuals. At S5, the IM availability (or IM availabilities) sent to the server at S4 is transmitted to potential interlocutor(s).

At (optional) S6, a user's IM application receives an IM invitation from a potential interlocutor. At S7, it is determined whether the user is available to the potential interlocutor, based on the IM availability established for the potential interlocutor at S3. If so (i.e., "Yes" at S7), an alert message is generated at S8 to alert the user to the IM invitation. If not (i.e., "No" at S7), the IM invitation is blocked at S9.

Figure 2:
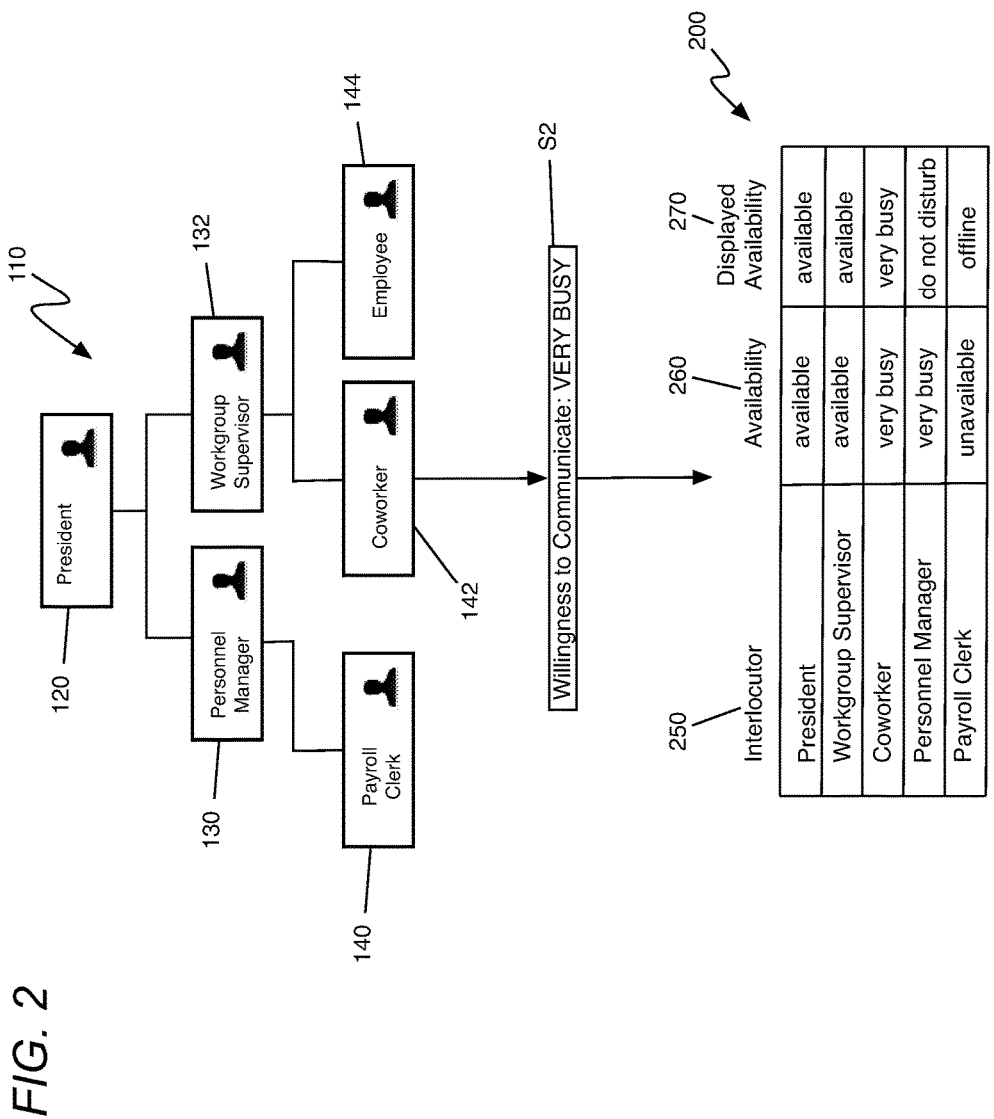
FIG. 2 shows a detailed view of portions of the flowchart of FIG. 1.

FIG. 2 shows a more detailed view of S1 through S3 of FIG. 1. Organizational chart 110 shows the relative position of an employee 144 using an IM program according to the invention relative to the positions of other members of the organization. As in FIG. 1, above, the employee 144 has defined his willingness to communicate at S2 as "very busy."

Table 200 shows the IM availabilities established at S3 based on organizational chart 110 and the willingness to communicate defined at S2. Table 200 includes an interlocutor column 250 containing the name and/or position of each member of the organization other than the employee 144, an availability column 260 containing the IM availability of the employee 144 established for each member of the organization (e.g., the IM availabilities sent to the server at S4 of FIG. 1), and a displayed availability column 270 containing the IM availability of the employee that will be transmitted to each member of the organization (e.g., the IM availabilities transmitted at S5 of FIG. 1).

As can be seen in FIG. 2, based on organizational chart 110 and a single willingness to communicate defined at S2, the employee's IM availability is both differentially established for and displayed to each member of the organization. For example, the employee's IM availability and displayed availability is "available" for both the President and Workgroup Supervisor, since both are located higher than the employee in the organizational chart 110. The IM availability and displayed availability is "very busy" for the employee's coworker, since the coworker may need to communicate important information to the employee, but should know that the employee should not be disturbed unless absolutely necessary. The IM availability for the Personnel Manager is "very busy," since the Personnel Manager is located higher than the employee in the organizational chart 110, but does not directly supervise the employee. The IM availability displayed to the Personnel Manager ("do not disturb") is different than the established IM availability, however, since messages from the Personnel Manager are less likely to be of immediate importance to the employee. Finally, the IM availability for the Payroll Clerk is "unavailable" and the displayed availability is "offline," since the Payroll Clerk is not higher than the employee in the organizational chart 110 and messages from the Payroll Clerk are unlikely to be of immediate importance to the employee.

Figure 3:
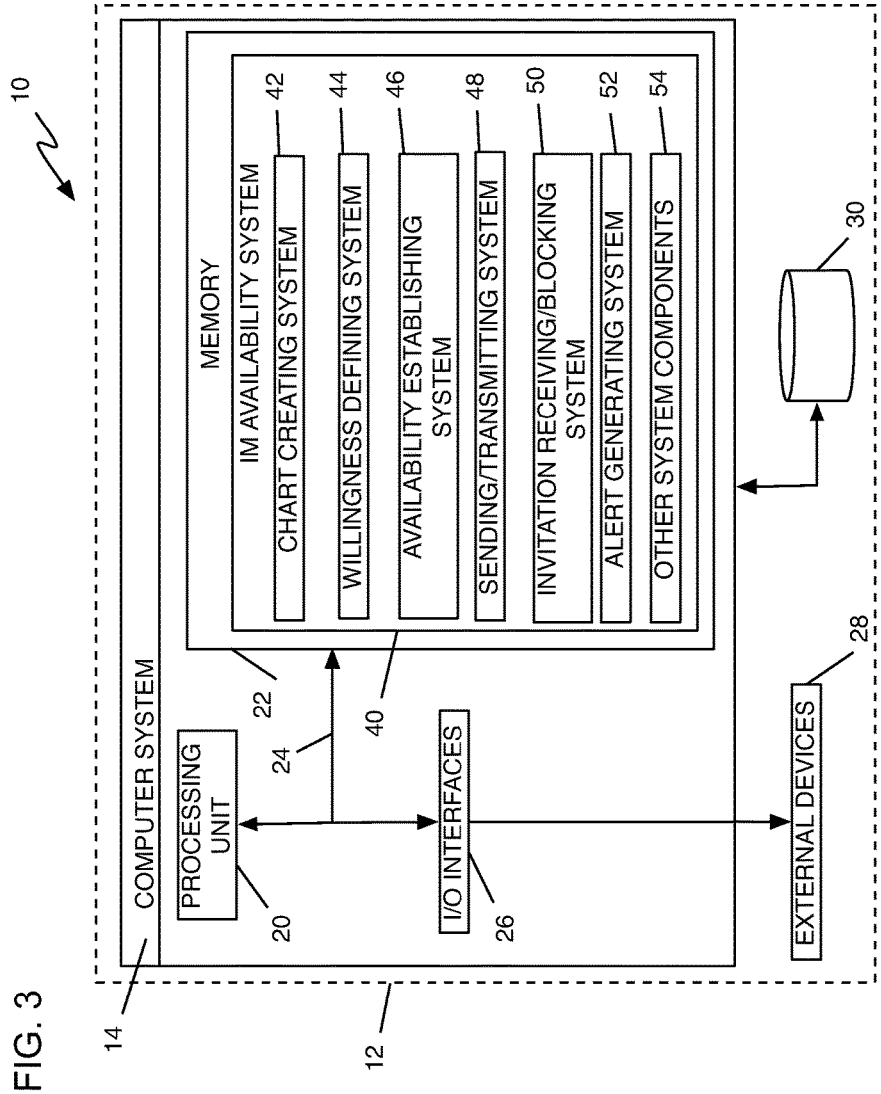
FIG. 3 shows an illustrative system according to the invention.

FIG. 3 shows an illustrative system 10 for differentially displaying an IM availability. To this extent, system 10 includes a computer infrastructure 12 that can perform the various process steps described herein for differentially displaying an IM availability. In particular, computer infrastructure 12 is shown including a computer system 14 that comprises an IM availability system 40, which enables computer system 14 to differentially display a user's IM availability by performing the process steps of the invention.

Computer system 14 is shown including a processing unit 20, a memory 22, an input/output (I/O) interface 26, and a bus 24. Further, computer system 14 is shown in communication with external devices 28 and a storage system 30. In general, processing unit 20 executes computer program code, such as IM availability system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and IM availability system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, IM availability system 40 enables computer system 14 to differentially display a user's IM availability. To this extent, IM availability system 40 is shown including a chart creating system 42, a willingness defining system 44, an availability establishing system 46, a sending/transmitting system 48, an invitation receiving/blocking system 50, and an alert generating system 52. Operation of each of these systems is discussed above. IM availability system 40 may further include other system components 54 to provide additional or improved functionality to IM availability system 40. It is understood that some of the various systems shown in FIG. 3 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for differentially displaying an IM availability, it is understood that the invention further provides various alternative embodiments. For example, in one embodiment, the invention provides a computer-readable medium that includes computer program code to enable a computer infrastructure to differentially display an IM availability. To this extent, the computer-readable medium includes program code, such as IM availability system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), and/or on one or more data storage portions of a computer system, such as memory 22 and/or storage system 30 (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to differentially display an IM availability as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for differentially displaying an IM availability. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for differentially establishing an instant messaging (IM) status for potential interlocutors, the method comprising:

creating a relationship chart of potential interlocutors using a hierarchical organizational chart including a user in which a first potential interlocutor occupies a position higher than the user in the hierarchical organizational chart, a second potential interlocutor occupies a position equal to the user in the hierarchical organizational chart, and a third potential interlocutor occupies a position that is lower than the user in the hierarchical organizational chart, wherein the hierarchical organizational chart used to establish the IM status for the potential interlocutors includes relative positions of the potential interlocutors within a business or a group to which the user belongs, wherein the hierarchical organizational chart is predetermined based on job titles within the business or the group to which the user belongs, wherein the first potential interlocutor is superior to the user within the business or the group to which the user belongs, wherein second potential interlocutor is equal to the user within the business or the group to which the user belongs, wherein the third potential interlocutor is subordinate to the user within the business or the group to which the user belongs, and wherein the relationship chart is created without user input;

receiving a single indication of the user's willingness to communicate, the user's willingness to communicate including a temporal component; and automatically establishing the IM status of the user for each of the first potential interlocutor, the second potential interlocutor, and the third potential interlocutor, wherein the IM status of the user is based on the relative position of each of the first potential interlocutor, the second potential interlocutor, and the third potential interlocutor within the business or the group to which the user belongs and the received single indication of the user's willingness to communicate, wherein the IM status includes:
an IM availability; and
an IM displayed availability based on the IM availability, and the relationship chart; and wherein:
the user's IM availability and IM displayed availability of the IM status to the first potential interlocutor indicates availability,
the user's IM availability of the IM status to the second potential interlocutor indicates unavailability, and the user's IM displayed availability of the IM status to the second potential interlocutor indicates a first displayed unavailability, and
the user's IM availability of the IM status to the third potential interlocutor indicates unavailability, and the user's IM displayed availability of the IM status to the third potential interlocutor indicates a second displayed unavailability, distinct from the first displayed unavailability.

2. The method of claim 1, further comprising:
blocking a potential interlocutor's IM invitation, in the case that the IM status of the user to the potential interlocutor indicates unavailability.

3. The method of claim 1, further comprising:
receiving an IM invitation from a potential interlocutor; and
generating an alert based on the IM status of the user to the potential interlocutor.

4. The method of claim 1, wherein the relationship chart is based on data related to past interlocutors.

5. A system comprising:
at least one computing device configured for differentially establishing an instant messaging (IM) status for potential interlocutors by performing a method comprising:
creating a relationship chart of potential interlocutors using a hierarchical organizational chart including a user in which a first potential interlocutor occupies a position higher than the user in the hierarchical organizational chart, a second potential interlocutor occupies a position equal to the user in the hierarchical organizational chart, and a third potential interlocutor occupies a position that is lower than the user in the hierarchical organizational chart,
wherein the hierarchical organizational chart used to establish the IM status for the potential interlocutors includes relative positions of the potential interlocutors within a business or a group to which the user belongs, wherein the hierarchical organizational chart is predetermined based on job titles within the business or the group to which the user belongs, wherein the first potential interlocutor is superior to the user within the business or the group to which the user belongs, wherein second potential interlocutor is equal to the user within the business or the group to which the user belongs, wherein the third potential interlocutor is subordinate to the user within the business or the group to which the user belongs, and wherein the relationship chart is created without user input;

receiving a single indication of the user's willingness to communicate, the user's willingness to communicate including a temporal component; and automatically establishing the IM status of the user for each of the first potential interlocutor, the second potential interlocutor, and the third potential interlocutor, wherein the IM status of the user is based on the relative position of each of the first potential interlocutor, the second potential interlocutor, and the third potential interlocutor within the business or the group to which the user belongs and the received single indication of the user's willingness to communicate, wherein the IM status includes:
an IM availability; and
an IM displayed availability based on the IM availability, and the relationship chart; and wherein:
the user's IM availability and IM displayed availability of the IM status to the first potential interlocutor indicates availability,
the user's IM availability of the IM status to the second potential interlocutor indicates unavailability, and the user's IM displayed availability of the IM status to the second potential interlocutor indicates a first displayed unavailability, and
the user's IM availability of the IM status to the third potential interlocutor indicates unavailability, and the user's IM displayed availability of the IM status to the third potential interlocutor indicates a second displayed unavailability, distinct from the first displayed unavailability.

6. The system of claim 5, wherein the method further comprises:
blocking a potential interlocutor's IM invitation, in the case that the IM status of the user to the interlocutor indicates unavailability.

7. The system of claim 5, wherein the method further comprises:
receiving an IM invitation from a potential interlocutor; and
generating an alert based on the IM status of the user to the potential interlocutor.

8. The system of claim 5, wherein the relationship chart is based on data related to past interlocutors.

9. A program product stored on a computer-readable storage medium, which when executed, differentially establishes an instant messaging (IM) status for potential interlocutors, the program product being operable to carry out a method comprising:
creating a relationship chart of potential interlocutors using a hierarchical organizational chart including a user in which a first potential interlocutor occupies a position higher than the user in the hierarchical organizational chart, a second potential interlocutor occupies a position equal to the user in the hierarchical organizational chart, and a third potential interlocutor occupies a position that is lower than the user in the hierarchical organizational chart,
wherein the hierarchical organizational chart used to establish the IM status for the potential interlocutors includes relative positions of the potential interlocutors within a business or a group to which the user belongs,
wherein the hierarchical organizational chart is predetermined based on job titles within the business or the group to which the user belongs,
wherein the first potential interlocutor is superior to the user within the business or the group to which the user belongs,
wherein second potential interlocutor is equal to the user within the business or the group to which the user belongs,
wherein the third potential interlocutor is subordinate to the user within the business or the group to which the user belongs, and
wherein the relationship chart is created without user input;
receiving a single indication of a user's willingness to communicate, the user's willingness to communicate including a temporal component; and
automatically establishing the IM status of the user for each of the first potential interlocutor, the second potential interlocutor, and the third potential interlocutor, wherein the IM status of the user is based on the relative position of each of the first potential interlocutor, the second potential interlocutor, and the third potential interlocutor within the business or the group to which the user belongs and the received single indication of the user's willingness to communicate,
wherein the IM status includes:
an IM availability; and
an IM displayed availability based on the IM availability, and the relationship chart; and
wherein:
the user's IM availability and IM displayed availability of the IM status to the first potential interlocutor indicates availability,
the user's IM availability of the IM status to the second potential interlocutor indicates unavailability, and the user's IM displayed availability of the IM status to the second potential interlocutor indicates a first displayed unavailability, and
the user's IM availability of the IM status to the third potential interlocutor indicates unavailability, and the user's IM displayed availability of the IM status to the third potential interlocutor indicates a second displayed unavailability, distinct from the first displayed unavailability.

10. The program product of claim 9, wherein the method further comprises:
blocking a potential interlocutor's IM invitation, in the case that the IM status of the user to the potential interlocutor indicates unavailability.

11. The program product of claim 9, wherein the method further comprises:
receiving an IM invitation from a potential interlocutor; and
generating an alert based on the IM status of the user to the potential interlocutor.

12. The program product of claim 9, wherein the relationship chart in based on data related to past interlocutors.

13. A method for deploying an application for differentially establishing an instant messaging (IM) status for potential interlocutors, comprising:
providing a computer infrastructure being operable to:
create a relationship chart of potential interlocutors using a hierarchical organizational chart including a user in which a first potential interlocutor occupies a position higher than the user in the hierarchical organizational chart, a second potential interlocutor occupies a position equal to the user in the hierarchical organizational chart, and a third potential interlocutor occupies a position that is lower than the user in the hierarchical organizational chart,
wherein the hierarchical organizational chart used to establish the IM status for the potential interlocutors includes relative positions of the potential interlocutors within a business or a group to which the user belongs,
wherein the hierarchical organizational chart is predetermined based on job titles within the business or the group to which the user belongs,
wherein the first potential interlocutor is superior to the user within the business or the group to which the user belongs,
wherein second potential interlocutor is equal to the user within the business or the group to which the user belongs,
wherein the third potential interlocutor is subordinate to the user within the business or the group to which the user belongs, and
wherein the relationship chart is created without user input;
receive a single indication of the user's willingness to communicate, the user's willingness to communicate including a temporal component; and
automatically establish the IM status of the user for each of the first potential interlocutor, the second potential interlocutor, and the third potential interlocutor, wherein the IM status of the user is based on the relative position of each of the first potential interlocutor, the second potential interlocutor, and the third potential interlocutor within the business or the group to which the user belongs and the received single indication of the user's willingness to communicate,
wherein the IM status includes:
an IM availability; and
an IM displayed availability based on the IM availability, and the relationship chart; and
wherein:
the user's IM availability and IM displayed availability of the IM status to the first potential interlocutor indicates availability,
the user's IM availability of the IM status to the second potential interlocutor indicates unavailability, and the user's IM displayed availability of the IM status to the second potential interlocutor indicates a first displayed unavailability, and
the user's IM availability of the IM status to the third potential interlocutor indicates unavailability, and the user's IM displayed availability of the IM status to the third potential interlocutor indicates a second displayed unavailability, distinct from the first displayed unavailability.

14. The method of claim 13, wherein the computer infrastructure is further operable to:
   block a potential interlocutor's IM invitation, in the case that the IM status of the user to the potential interlocutor indicates availability.

15. The method of claim 13, wherein the computer infrastructure is further operable to:
   receive an IM invitation from a potential interlocutor; and
   generate an alert based on the IM status of the user to the potential interlocutor.

16. The method of claim 13, wherein the relationship chart is based on data related to past interlocutors.

17. The method of claim 1, wherein:
   the user's IM availability of the IM status to the second potential interlocutor indicating unavailability is a first unavailability indicator; and
   the user's IM availability of the IM status to the third potential interlocutor indicating unavailability is a second unavailability indicator, distinct from the first unavailability indicator.

18. The system of claim 5, wherein:
   the user's IM availability of the IM status to the second potential interlocutor indicating unavailability is a first unavailability indicator; and
   the user's IM availability of the IM status to the third potential interlocutor indicating unavailability is a second unavailability indicator, distinct from the first unavailability indicator.

19. The program product of claim 9, wherein:
   the user's IM availability of the IM status to the second potential interlocutor indicating unavailability is a first unavailability indicator; and
   the user's IM availability of the IM status to the third potential interlocutor indicating unavailability is a second unavailability indicator, distinct from the first unavailability indicator.

20. The method of claim 13, wherein:
   the user's IM availability of the IM status to the second potential interlocutor indicating unavailability is a first unavailability indicator; and
   the user's IM availability of the IM status to the third potential interlocutor indicating unavailability is a second unavailability indicator, distinct from the first unavailability indicator.

* * * * *